Oct. 17, 1950 M. S. HECKER 2,525,799
OXYGEN CHECK VALVE
Filed Nov. 4, 1947
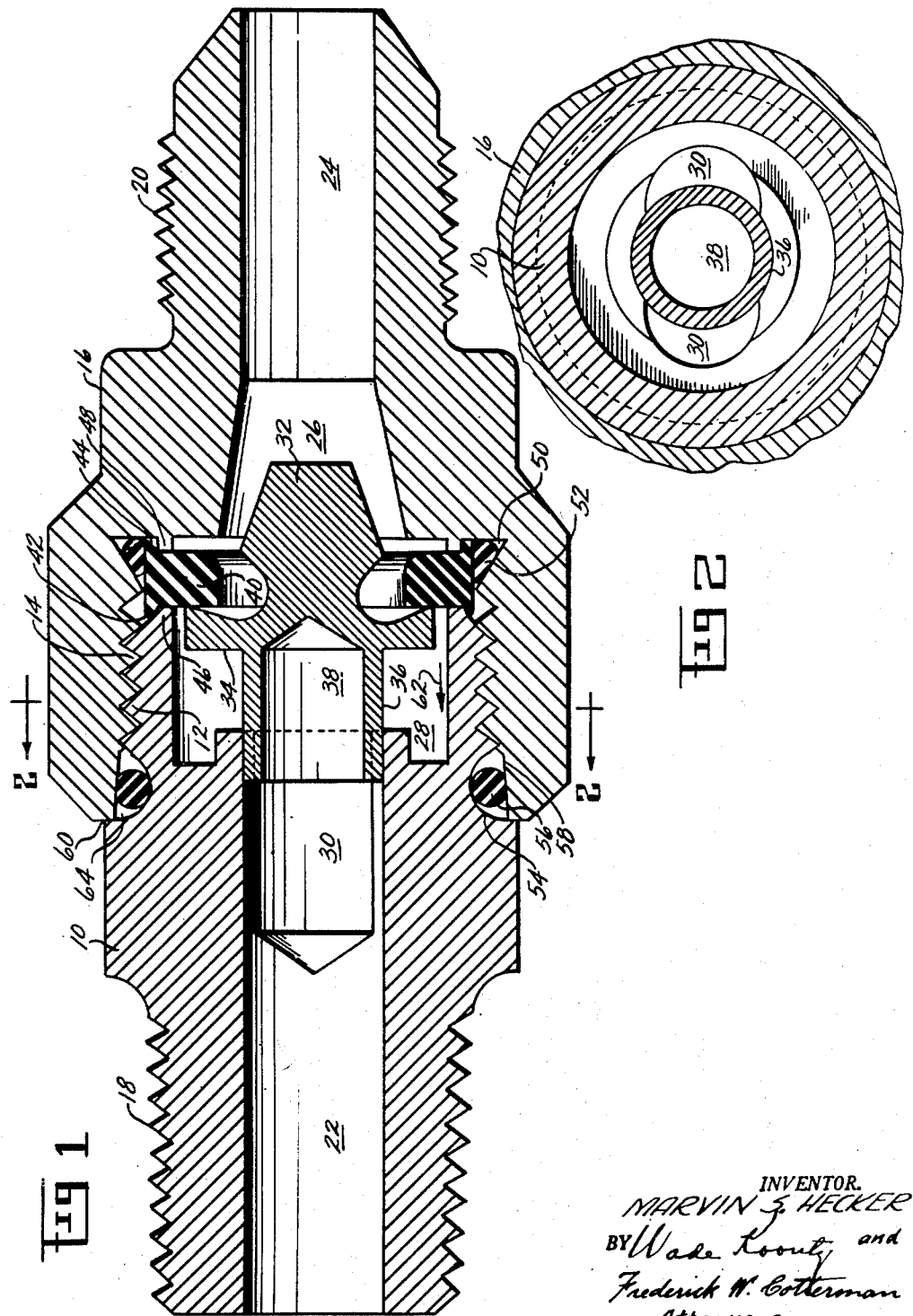
INVENTOR.
MARVIN S. HECKER
BY Wade Koontz and
Frederick W. Cotterman
Attorneys Patented Oct. 17, 1950

2,525,799

UNITED STATES PATENT OFFICE 2,525,799

OXYGEN CHECK VALVE

Marvin S. Hecker, Albany, N. Y.

Application November 4, 1947, Serial No. 783,887

5 Claims. (Cl. 251—127)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to low pressure oxygen check valves and particularly to means for pressure sealing a valve of this kind.

Valves of this character are required to be operative throughout a considerable temperature range, and one of the difficulties to be overcome in the design of such a valve consists in effecting a seal at the several joints which will hold the pressure when the temperature within which the valve is operating falls to a low value, usually about —67° F.

It is therefore an object of this invention to so construct and arrange the several metal parts and the several seals of a valve of this kind that it will remain operative to hold the pressure at a much lower temperature, e. g. —80° F.

Since the rubber or synthetic rubber from which the seals for these valves are made has a low limit of temperature at which the seals remain flexible it is another object of the invention to so shape and fit the seals and the spaces which they occupy that maximum distortion and compression of the seal rings are not initially effected, to the end that expansion of the seal material may be effective to maintain the seal down to the low limit of temperature at which resiliency of the seal rings ceases.

Other objects and advantages will become evident as a detailed description of the invention proceeds and reference is made to the drawing, wherein:

Fig. 1 is a longitudinal axial section through a check valve embodying the principle of my invention;

Fig. 2 is a transverse section taken through Fig. 1 at 2—2.

Like reference characters refer to like parts throughout the several views.

Referring to the drawing, an internal housing part 10 is externally threaded at 12 to fit into the internal threads 14 of the external housing part 16. Internal and external housing parts 10 and 16 are externally threaded at 18 and 20 respectively for connection to an oxygen supply line.

Internal and external housing parts 10 and 16 have central openings 22 and 24 respectively for the passage of the oxygen. A tapered orifice 26 joins the opening 24 to the main valve chamber 28. Two crescent shaped passageways 30 join the valve chamber 28 to the opening 22 when the valve is in position.

A valve head 32 has a valve disc 34 and a valve stem 36 integral. The valve stem 36 is preferably drilled out as at 38 for lightness. The valve stem 36 is slidably fitted to that part of the opening 22 which is not interrupted by the crescent shaped openings 30.

A seat for the valve disc 34 is provided in the form of a seat ring 40 of synthetic rubber or a like material having annular ribs 42 and 44, one on each side around the periphery. The rib 42 surrounds the annular end 46 of the housing part 10. The rib 44 surrounds the annular rib 48 which is formed on the housing part 16, whereby the seat washer is held in place.

At the inner end of the thread 14 in the housing part 16 is an annular V groove 50 into which a seal ring 52 is fitted. This seal ring 52 may be made an integral part of the seat washer 40 but will assemble more readily if made separately.

An annular groove 54 of semicircular cross section surrounds the housing part 10, and an O ring 56 lies in this groove, the diameter of the cross section of the O ring being slightly greater than the radius of the cross section of the groove. The bore of the housing part 16, at the large end, flares as at 58, whereby, when the housing parts 10 and 16 are screwed together, the O ring 56 will be slightly but not greatly compressed and deformed. The shoulder 60 may be so proportioned as to stop further screwing together of the housing parts when the synthetic rubber parts 40, 52 and 56 have been compressed and deformed the desired amount.

It will be noted that the O ring 56 does not completely fill the groove 54 as is the case with most seals of this type. After the initial deformation which is controlled by the flared bore 58 and shoulder 60, the ring will not further deform except by leakage passing between external and internal threads 12 and 14 in the direction of the arrow 62. When this occurs, the ring 56 may be forced into the gradually decreasing space 64 whereby the leakage pressure itself effects the seal. By using a "Buna N" composition "Hycar OR 25" the ring 56 will not take a permanent set until a temperature of −80° F. is reached.

Having described one embodiment of my invention, I claim:

1. In a check valve of the character described, a first housing part having a longitudinal opening therethrough, said opening being enlarged at one end to provide a valve chamber, a second housing part having an opening therethrough axially aligned with said longitudinal opening, an externally threaded portion on said first housing part surrounding said valve chamber, an internally threaded portion on said second housing part screwed over said externally threaded portion, an annular shoulder formed on the first housing part positioned to act as a stop for the end of the second housing part when the two housing parts are screwed together, a first annular rib formed on the end of the first housing part surrounding said chamber, a second annular rib of the same size as the first annular rib axially spaced from the first annular rib formed on the second housing part and facing toward the said first annular rib, a synthetic rubber seat washer having annular ribs formed thereon surrounding the said first and said second annular ribs and dimensioned to be pinched between the first and second annular ribs when the end of said second housing part is screwed against said shoulder on the first housing part, a valve disc within said chamber resting on said seat washer, a valve stem integral with said disc having free sliding bearing in said longitudinal opening, there being passageways formed in the wall of said opening from said chamber around said valve stem and into said longitudinal opening, an internal V groove at the inner end of said internal thread, a seal ring in said V groove surrounding and in sealing engagement with said seat washer, an annular groove of semicircular cross section around said first housing part at the inner end of the external thread, and a synthetic rubber O ring in said semicircular groove, there being an outwardly flared bore formed on the inside of the second housing part around said semicircular groove, dimensioned to slightly deform said O ring.

2. In a check valve of the character described, a first housing part having a longitudinal opening therethrough, said opening being enlarged at one end to provide a valve chamber, a second housing part having an opening therethrough axially aligned with said longitudinal opening, an externally threaded portion on said first housing part surrounding said valve chamber, an internally threaded portion on said second housing part screwed over said externally threaded portion, an annular shoulder formed on the first housing part positioned to act as a stop for the end of the second housing part when the two housing parts are screwed together, a first annular rib formed on the end of the first housing part surrounding said chamber, a synthetic rubber seat washer having an annular rib formed thereon surrounding the said first annular rib and dimensioned to be pinched between the first annular rib and the second housing part when the end of said second housing part is screwed against said shoulder on the first housing part, a valve disc within said chamber resting on said seat washer, a valve stem integral with said disc having free sliding bearing in said longitudinal opening, there being passageways formed in the wall of said opening from said chamber around said valve stem and into said longitudinal opening, an internal V groove at the inner end of said internal thread, a seal ring in said V groove surrounding and in sealing engagement with said seat washer, an annular groove of semicircular cross section around said first housing part at the inner end of the external thread, and a synthetic rubber O ring in said semicircular groove, there being an outwardly flared bore formed on the inside of the second housing part around said semicircular groove, dimensioned to slightly deform said O ring.

3. In a check valve of the character described, a first housing part having a longitudinal opening therethrough, said opening being enlarged at one end to provide a valve chamber, a second housing part having an opening therethrough axially aligned with said longitudinal opening, an externally threaded portion on said first housing part surrounding said valve chamber, an internally threaded portion on said second housing part screwed over said externally threaded portion, an annular shoulder formed on the first housing part positioned to act as a stop for the end of the second housing part when the two housing parts are screwed together, a synthetic rubber seat washer dimensioned to be pinched between surfaces of the first and second housing parts when the end of said second housing part is screwed against said shoulder on the first housing part, a valve disc within said chamber resting on said seat washer, a valve stem carried by said disc having free sliding bearing in one of said openings, there being passageways from said chamber past said valve stem and into said longitudinal opening, an annular groove of semicircular cross section around said first housing part at the inner end of the external thread, and a synthetic rubber O ring in said annular groove, the diameter of the cross section of the O ring being greater than the radius of the cross section of the groove, there being an outwardly flared bore formed on the inside of the second housing part around said annular groove, dimensioned to slightly deform said O ring.

4. In a check valve of the character described, a first housing part having a longitudinal opening therethrough, said opening being enlarged at one end to provide a valve chamber, a second housing part having an opening therethrough axially aligned with said longitudinal opening, an externally threaded portion on said first housing part surrounding said valve chamber, an internally threaded portion on said second housing part screwed over said externally threaded portion, an annular shoulder formed on the first housing part positioned to act as a stop for the end of the second housing part when the two housing parts are screwed together, a check valve within said valve chamber, an annular groove of semicircular cross section around said first housing part at the inner end of the external thread, and a synthetic rubber O ring in said annular groove, the diameter of the cross section of the O ring being at least equal to the radius of the cross section of the groove there being an outwardly flared bore formed on the inside of the second housing part around said annular groove dimensioned to slightly deform said O ring when said first and second housing parts are screwed together to said stop.

5. A self-adjusting seal for preventing leakage between intermeshed external and internal screw threads which comprises an outwardly flared bore at the outer end of an internally threaded part, the diameter of the smaller end of said bore being larger than the root diameter of the said internal threads, an annular groove of semicircular cross section extending around an externally threaded part, said groove being located on the inner end of said external threads, stop means for arresting screwing together of said externally and internally threaded parts when the flared bore overlies the said groove, and an O ring of a cross sectional diameter substantially equal to the radius of said semicircular groove lightly held in contact with the bottom of said groove and said flared bore substantially midway of the width of the annular groove.

MARVIN S. HECKER.

REFERENCES CITED

The following references are of record in the file of this patent:

UNITED STATES PATENTS

| Number | Name | Date |
|---|---|---|
| 83,899 | Allison | Nov. 10, 1868 |
| 797,796 | Devlin | Aug. 22, 1905 |
| 1,473,667 | Burks | Nov. 13, 1923 |
| 2,110,825 | Archer | Mar. 8, 1935 |
| 2,187,217 | Winslow | Jan. 16, 1940 |
| 2,223,944 | Roy | Dec. 3, 1940 |
| 2,314,683 | Berry | Mar. 23, 1943 |
| 2,333,288 | Bentzel | Nov. 2, 1943 |
| 2,443,312 | Geiger | June 15, 1948 |